United States Patent
Abadie et al.

(10) Patent No.: US 11,928,458 B2
(45) Date of Patent: Mar. 12, 2024

(54) METHOD FOR UPDATING A DIGITAL SYSTEM

(71) Applicant: Nissan Motor Co., Ltd., Yokohama (JP)

(72) Inventors: Eric Abadie, Boulogne-Billancourt (FR); Marie-Cecile Afantenos, Labarthe sur Leze (FR); Sébastien Bessiere, Tournefeuille (FR); Solène Gros, Issy-les-Moulineaux (FR); Claire Tenor, Orgerus (FR); Gregory Meunier, Toulouse (FR)

(73) Assignee: Nissan Motor Co., Ltd., Yokohama (JP)

( * ) Notice: Subject to any disclaimer, the term of this patent is extended or adjusted under 35 U.S.C. 154(b) by 105 days.

(21) Appl. No.: 17/776,630

(22) PCT Filed: Nov. 24, 2020

(86) PCT No.: PCT/EP2020/083141
§ 371 (c)(1),
(2) Date: May 13, 2022

(87) PCT Pub. No.: WO2021/105089
PCT Pub. Date: Jun. 3, 2021

(65) Prior Publication Data
US 2022/0405085 A1    Dec. 22, 2022

(30) Foreign Application Priority Data
Nov. 29, 2019 (FR) .................................... 1913530

(51) Int. Cl.
*G06F 8/65*    (2018.01)
*B60W 50/02*    (2012.01)
(Continued)

(52) U.S. Cl.
CPC ....................................... *G06F 8/65* (2013.01)

(58) Field of Classification Search
CPC .......... G06F 8/658; G06F 9/445; G06F 17/00; G06F 8/71; G06F 8/65; G06F 11/3668;
(Continued)

(56) References Cited

U.S. PATENT DOCUMENTS 11,718,310 B2 *   8/2023   Jung .................... G06F 11/1433
                                                                        717/169
2007/0278966 A1 *   12/2007   Chemin ................... H02P 9/102
                                                                        315/209 R
(Continued)

FOREIGN PATENT DOCUMENTS

DE       102017217807 A1    4/2019
EP            2249251 A1    11/2010
(Continued)

*Primary Examiner* — Thuy Dao
(74) *Attorney, Agent, or Firm* — Global IP Counselors, LLP

(57) ABSTRACT

A method updates a digital system in a vehicle having an onboard client computer that communicates with a remote server, an onboard monitor-control unit operatively connected to the onboard client computer, and an electrical energy accumulator device for powering the onboard client computer and the onboard monitor-control unit. The method includes downloading a file from the remote server using the onboard client computer as long as the electrical energy accumulator device is capable of being recharged. Then at least part of the file that was downloaded is distributed to the onboard monitor-control unit using the onboard client computer. Then, all or a portion of the at least part of the file that was distributed is installed in the onboard monitor-control unit. Then the at least part of the file that was installed is activated after stopping the vehicle using the onboard monitor-control unit.

9 Claims, 7 Drawing Sheets

(51) Int. Cl.
*G06F 9/445* (2018.01)
*G06F 9/455* (2018.01)

(58) Field of Classification Search
CPC ........ G06F 11/00; G06F 8/654; F01D 21/003; F01D 19/00; G07C 5/006; H04L 12/66; H04L 41/0895; H04L 12/4625; H04L 41/082; H04L 12/4001; H04L 12/40169; B60R 16/02; B60R 16/023
See application file for complete search history.

(56) References Cited

U.S. PATENT DOCUMENTS

| | | | | |
|---|---|---|---|---|
| 2014/0380299 | A1* | 12/2014 | Nakamura | H04N 7/15 |
| | | | | 717/173 |
| 2016/0350100 | A1* | 12/2016 | Folske | G06F 8/654 |
| 2018/0183605 | A1* | 6/2018 | Kawabata | H04L 9/0819 |
| 2019/0258476 | A1* | 8/2019 | Miyazaki | G06F 8/658 |
| 2021/0122234 | A1* | 4/2021 | Stack | B60K 15/05 |
| 2022/0326932 | A1* | 10/2022 | Inoue | B60R 16/023 |

FOREIGN PATENT DOCUMENTS

| | | |
|---|---|---|
| FR | 2775363 A1 | 8/1999 |
| FR | 2775371 A1 | 8/1999 |
| FR | 3011651 A1 | 4/2015 |

* cited by examiner

METHOD FOR UPDATING A DIGITAL SYSTEM

CROSS-REFERENCE TO RELATED APPLICATIONS

This application is a U.S. national stage application of International Application No. PCT/EP2020/083141, filed on Nov. 24, 2020, which claims priority to French Application No. 1,913,530, filed on Nov. 29, 2019.

BACKGROUND

Technical Field

The invention relates to a method for updating a digital system in a vehicle, notably in an automobile vehicle.

Background Information

In a manner known per se, a digital system in a vehicle comprises one or more onboard computers communicating with one another via one or more onboard buses. It is recalled that an onboard computer generally comprises a non-volatile memory for storing at least permanent digital data, a firmware and/or a computer program. The onboard computer generally also comprises a volatile memory for storing variable digital data, and at least one processor for writing and/or reading variable digital data in a volatile memory by executing the computer program using all or part of the permanent digital data and the variable digital data. An update of the digital system consists in modifying a digital content of the non-volatile memory of at least one onboard computer.

The document FR2775363 discloses a vehicle computer designed to be connected to a tool for updating stored data but it is preferable to stop the vehicle in order to connect the update tool.

The document FR3011651 discloses a method for updating a vehicle computer using an interface box, however the implementation of the method requires the vehicle to be stationary to connect the box.

The document FR2775371 discloses a method for downloading an update file into a re-writable memory of a vehicle computer. Today, a large range of possibilities for remote wireless transmissions offers opportunities for downloading update files into vehicle onboard monitor-control units without having to physically connect to the vehicle. However, the known methods and devices still require a more or less extended time for the vehicle to update a data or program file in an onboard monitor-control unit. The writing from a remote server into a re-writable memory of an onboard monitor-control unit requires more time than in a conventional computer memory or than in a mobile telephone. A stationary vehicle remains advisable in order to avoid a spurious change in behavior of the vehicle while being driven, associated with the update. There is a need to reduce to a minimum the update time for a monitor-control unit, notably for reducing to a minimum the unavailability time of the vehicle, in order to go from a prior configuration of onboard monitor-control unit to a new configuration by a programming or data update.

The document EP2249251A1 discloses an update device comprising a server, an onboard monitor-control unit in a vehicle, means of communication for connecting the server and the onboard monitor-control unit, in which, when the server executes a process for re-writing a program of the onboard monitor-control unit via the means of communication, the server determines whether or not it has to execute the re-writing of the program by referring to a memory content of the onboard monitor-control unit. If an anomaly or a break in communication occurs in the course of the re-writing task, the re-writing process is not continued, a reset to zero is executed and the earlier program is launched.

SUMMARY

It has been discovered that the devices disclosed by the aforementioned documents have numerous drawbacks notably including that of differing the update of the onboard monitor-control unit to a date unacceptably far off in the case of anomalies and/or of repeated breaks in communications. Such cases can occur in a vehicle, for example when it is in a tunnel or in an underground car park, for example also in the case of a voltage drop on the onboard electrical supply system of the vehicle to which the telecommunications and the writing into a re-writable memory are sensitive, furthermore highly consuming of electricity. Each attempt to re-write a program needed for the operation of the vehicle renders the vehicle unavailable until the re-written program or the earlier program is launched depending on whether the re-writing has been correctly executed or not.

In order to overcome the drawbacks presented by the prior art, one subject of the invention is a method for updating a digital system in a vehicle comprising an onboard client computer, notably of the multimedia type, capable of communicating with a remote server, an onboard monitor-control unit connected, directly or indirectly, to the client computer via an onboard communications network, and an electrical energy accumulator device for powering the onboard computer and the onboard monitor-control unit.

The method is noteworthy in that it comprises:
 a download step in which the client computer downloads a file from the remote server when the electrical energy accumulator device is able to be recharged;
 a distribution step in which the client computer distributes, directly or indirectly, at least a part of the downloaded file to the onboard monitor-control unit;
 an installation step in which all or a portion of said at least one distributed part of the downloaded file is installed in the onboard monitor-control unit;
 an activation step in which the onboard monitor-control unit activates the portion or portions of installed file after stopping the vehicle.

The computer is referred to as client in that it is distinguished from the monitor-control unit by its capacity to process other types of media than monitoring/controlling of actuators and of sensors of the vehicle, such as for example to process a download using the FTP protocol. By using the processing resources of the client computer for downloading an update file, the resources needed for the update in the monitor-control unit, and consequently its cost, are reduced, which effect is all the more advantageous since an onboard digital system generally comprises numerous monitor-control units. The time for downloading is totally transparent for the monitor-control unit because the latter is not impacted by the download. Since the electrical energy accumulator device is able to be recharged during the downloading, this ensures that not only the downloading, but also other electrical consumers of the vehicle are not affected by the electrical consumption of the downloading. The distribution and installation steps carried out after the download, decorrelated from the download step, do not require any connection to the remote server in order to be executed. A multimedia computer is one example of a client computer. The onboard monitor-control unit is connected, directly or indirectly, to the client computer; this can therefore be any type of monitor-control unit irrespective of the manner in which it is connected to the client computer, whether this be for example directly via a communications link, or else via a gateway computer and communications links, or else in both manners. By way of its resources, the client computer is interfaced with a remote server and, directly or indirectly, controls the various steps of the method according to the invention; for example, it indirectly distributes a part of the downloaded file destined for certain onboard monitor-control units for which the distribution is controlled by the client computer then managed by the gateway computer.

Advantageously, in the download step, the client computer constantly stores a point of progression of the download in such a manner as to halt the download when an effective or risk of degradation in communication with the remote server is detected, and continues with the download starting from the stored point of progression when it detects that the effective or risk of degradation in communication with the remote server has disappeared.

It is thus possible to interrupt the downloading as many times as needed in the case of an effective or risk of degradation in communication, then to continue with it when good conditions are recovered, with no detriment to the following steps which can subsequently be carried out without a connection.

The causes of effective degradations in communication are manyfold: passage of the vehicle into a tunnel or into an underground car park, interruption by another process with higher priority over the download, failure of the remote server or other issues.

In particular, the electrical energy accumulator device not in a state of being able to be recharged is considered by the method as constituting a condition for detection of risk of degradation in communication with the remote server.

More particularly, when the vehicle comprises a thermal engine, the electrical energy accumulator device is considered as able to be recharged if the thermal engine is running.

When the thermal engine is running, this allows for example the electrical energy accumulator device to be recharged by means of an alternator or of an alternator-starter.

More particularly also, when the vehicle comprises an electric drive battery, the electrical energy accumulator device is considered as able to be recharged if the electric drive battery is connected to an external electrical recharging system. This can be the case not only for a vehicle with a purely electric drive, but also for a hybrid vehicle rechargeable from an external electrical system or by means of the thermal engine.

Advantageously, the onboard communications network comprises a first onboard link connected to the client computer, a second onboard link connected to the onboard monitor-control unit and a gateway computer connected to the client computer and to the onboard monitor-control unit, an execution of the installation step for all or the distributed part of the downloaded file in the onboard monitor-control unit by the gateway computer allowing the onboard monitor-control unit to be unburdened of the installation tasks, thus keeping the onboard monitor-control unit entirely available for its monitor-control tasks, for any monitor-control unit which has at least one processor indirectly connected to the client computer via the gateway.

Advantageously, by equipping the onboard communications network with a first onboard bus connected to the client computer, a second onboard bus connected to the onboard monitor-control unit, and a gateway computer connected to both said onboard buses, an execution of the step for installation of all or the distributed part of the downloaded file in the onboard monitor-control unit, by the gateway computer, allows the onboard monitor-control unit to be unburdened of the installation tasks, thus keeping the onboard monitor-control unit entirely available for its monitor-control tasks, notably for any monitor-control unit indirectly connected to the client computer via the gateway.

In particular, by equipping the onboard monitor-control unit with two banks of executable re-writable memory, the method consists in making the onboard monitor-control unit operate on a first bank of re-writable memory while the installation step is applied to a second bank of re-writable memory.

Thus, the monitor-control unit just needs to be switched from the first bank of executable re-writable memory onto the second bank in order to activate the update, the first bank then playing the role of the second bank with a view to a later update.

A short stop of the vehicle may suffice since the availability of the monitor-control unit during the preceding download, distribution and installation steps allows the vehicle to be driven until it is stopped, then executed simply to avoid the user of the vehicle being surprised by a change of behavior while driving the vehicle.

Advantageously, the method comprises a step for pre-downloading descriptive data, which will allow the digital contents of the downloaded files to be characterized and the user experience to be dynamically configured during each update.

In particular, the downloaded file obtained at the end of the download step comprises other descriptive data, which will notably allow the digital contents of the downloaded files to be rendered secure for the monitor-control units directly connected to the client computer.

Advantageously, at least a part of the pre-downloaded descriptive data comprises configuration metadata.

More particularly, the method comprises at least one step for verification of at least one activation condition, said at least one activation condition being a function of at least a part of the descriptive data which allows the dynamic configuration, in other words a diversified and dynamic management of the update campaigns, which may thus be defined upstream in an off-board manner.

Advantageously, at least one of said steps of the method for updating a digital system comprises a sub-step for interaction between the human-machine interface apparatus and the user via the human-machine interface apparatus according to a specific mode of interaction, notably depending on said step in progress. For example, the comfort of the user is further improved when the activation step requires an authorization of a user of the vehicle in order to be executed.

Another subject of the invention is an onboard digital system in a vehicle comprising an onboard client computer capable of communicating with a remote server, an onboard monitor-control unit connected to the client computer via an onboard communications network, each powered by an electrical energy accumulator device, characterized in that the onboard client computer and the onboard monitor-control unit are programmed so as to execute the method according to the invention.

Advantageously, in the onboard digital system, the onboard communications network comprises a first onboard bus connected to the client computer, a second onboard bus connected to the onboard monitor-control unit, and a gateway computer connected to both said onboard buses, such that the gateway computer is programmed so as to execute the installation step according to the method.

Yet another subject of the invention is an automobile vehicle comprising an onboard digital system according to the invention.

Other advantages and features of the invention will become apparent upon reading the detailed description of embodiments and their implementation, by way of illustrative and non-limiting examples, with reference to the appended drawings.

BRIEF DESCRIPTION OF THE DRAWINGS

Referring now to the attached drawings which form a part of this original disclosure.

DETAILED DESCRIPTION OF EMBODIMENTS

Selected embodiments of the present invention are described below with reference to the drawings. For the sake of clarity, identical or similar steps are identified by identical reference signs throughout the figures.

Figure 1:
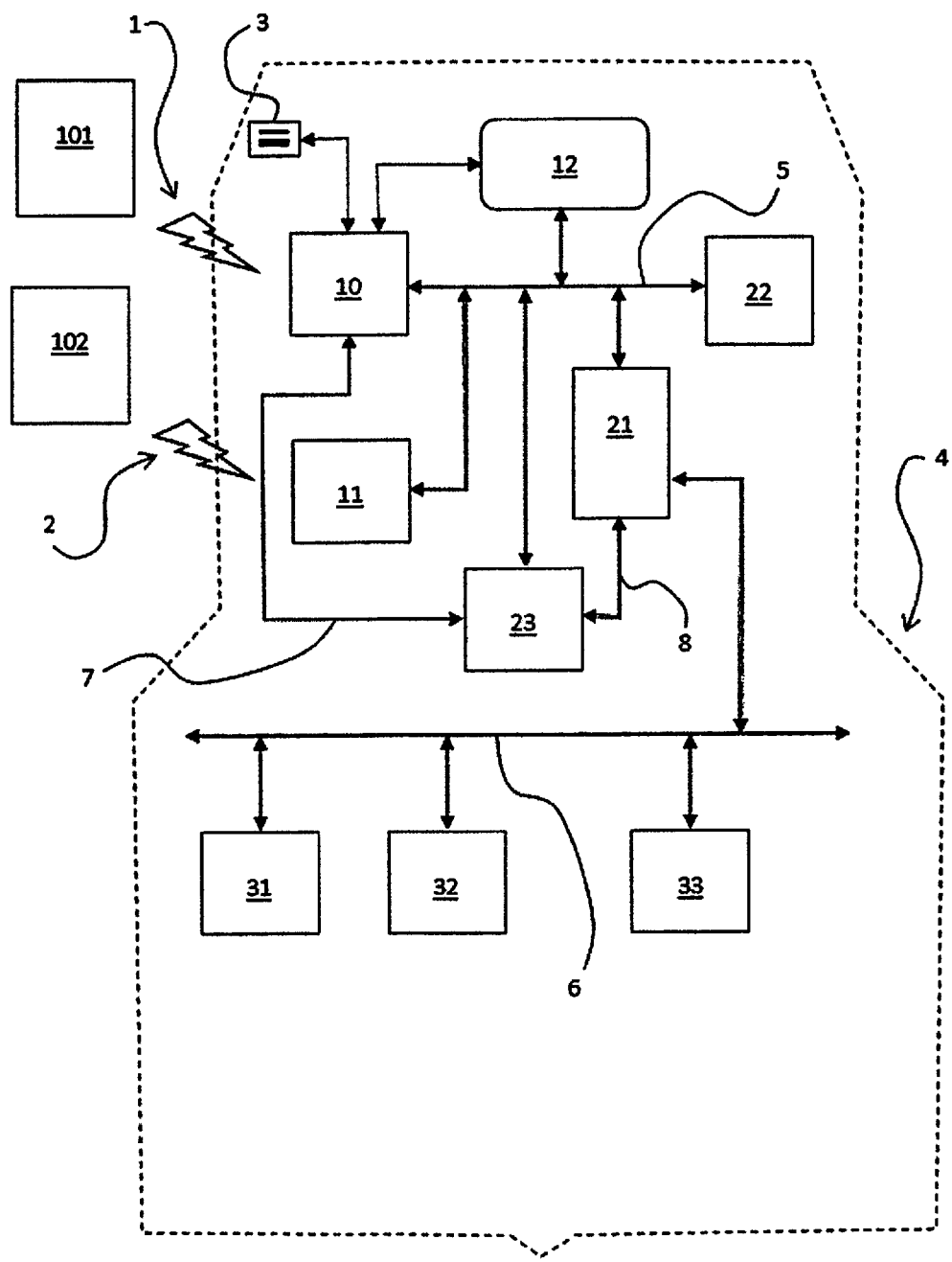
FIG. 1 shows schematically a vehicle comprising a digital system on which the invention is implemented.

FIG. 1 shows a vehicle 4 comprising a digital system in which the invention is implemented. The digital system comprises at least two onboard computers 10, 11, 21, 22, 23 arranged for communicating with one another over a first onboard communications bus 5. A human-machine interface apparatus 12, equipped with one or more screens, may comprise a coupler for communicating over the onboard bus 5.

The onboard client computer 10 comprises one or more processors and a memory capacity dimensioned to give it processing resources adapted to the processing of high volumes of digital information, such as that needed for the pictographic display and for the sensing of human commands via the onboard bus 5 or via a direct link over the human-machine interface apparatus 12, for the exchanges with other onboard computers of the digital system, for a communication outside of the vehicle and for the execution of computer programs at the operational and/or application level. The onboard client computer 10 is for example often denoted by the acronym IVI for In-Vehicle Infotainment system. For external communications, the onboard client computer 10 may be equipped with one or more sockets 3 of the USB, OBD or other type. A socket 3 of the USB type allows for example transfers of files stored, or to be stored, in the memory of a USB stick. The onboard client computer 10 may also be equipped with Over The Air (or OTA) means of communication for establishing communications 1, for example using a standard of the 802.11 type, with a remote server 101.

Aside from the client computer 10, the other computers are onboard monitor-control units, which may be of three different types. The first type, denoting the monitor-control units directly connected to the client computer 10 via the bus 5, are intelligent and possess de-encapsulation capacities because they are located in an unsecure area as they are situated before the gateway computer 21 and hence receive contents rendered secure by encapsulation(s). Their memories are preferably of the dual-bank internal type, in other words two banks of executable re-writable memory (for example Flash, EEPROM), or of the internal buffer memory type. The second type, denoting the monitor-control units indirectly connected to the client computer 10 via the gateway computer 21, are therefore in a secure area and of a more basic type. Their memories are preferably of the dual-bank internal type (two banks of executable re-writable memory, for example Flash, EEPROM) or of the external memory type. The third type denotes hybrid computers which have two processors, one therefore being linked to the client computer 10 and the other linked to the gateway computer 21.

The onboard computer 21 is of the gateway (GW) type. The onboard computer 21 allows digital information to be exchanged between the first onboard bus 5 and a second onboard bus 6 of the digital system. The digital system comprises one or more onboard computers 31, 32, 33 arranged for communicating with one another and with the onboard computer 21 over the second onboard bus 6. The onboard computer or computers 31, 32, 33 are of the ECU (acronym for Electronic Control Unit) type. In a manner furthermore known per se, an electronic control unit comprises one or more outputs each connected to an actuator of the vehicle, a coupler for communication over the onboard bus 6, and a digital processing electronic circuit for controlling, in a manner furthermore known per se by means of a firmware, the actuator or actuators as a function of digital data flowing over the onboard communications bus 6. Each onboard computer 31, 32, 33 constituting an electronic control unit may also comprise one or more inputs connected to sensors and/or to control mechanisms of the vehicle, for executing the firmware. The onboard bus 6 is represented in a simplified manner in FIG. 1, as it may comprise several branches connected together via secondary gateways not shown and without any particular impact on the operation of the invention.

According to various possible embodiments, the digital system of the vehicle 4 may also comprise an onboard computer 11 which comprises over the air means of communication over a longer distance than for example that of the 802.11 standard. The over the air (OTA) means of communication of the onboard computer 11 allow, for example in a manner furthermore known per se, a communication 2 to be established over a cellular telephone network of version 4G or higher with a remote server 102, identical to, distinct from and/or connected to the remote server 101. Other types of communication may be envisaged for the onboard computer 11, such as for example purely by way of non-exhaustive illustration, a satellite mode of communication or a mixed mode of downlink radio communication and of uplink GSM communication. The onboard computer 11 is not necessarily distinct from the onboard computer 10. In other words, versions of digital system may be envisioned in which the onboard client computer 10 incorporates the functionalities of the onboard computer 11. When it is distinct from the onboard computer 10, the onboard computer 11, such as it is illustrated in FIG. 1, is connected to the onboard client computer 10 via the bus 5 or via a direct link, in order to allow the onboard client computer 10 to benefit from its long-distance communication possibilities. The onboard computer 11 is then for example of the type often denoted by the acronym IVC (In-Vehicle Communication).

According to various possible embodiments, the digital system of the vehicle 4 may also comprise an onboard computer 22 without any direct incidence on the operation of the vehicle, and for this reason connected to the onboard bus 5.

According to various possible embodiments, the digital system of the vehicle 4 may also comprise an onboard computer 23 of the electronic control unit type with a high capacity for digital processing, for example for supervising and/or managing several functions of the vehicle 4. The onboard computer 23 is then connected to the onboard bus 5 for processing data without a direct incidence on the operation of the vehicle or data on which it can exert a security check. The computer 23 is connected to the onboard bus 5 for processing data with an incidence on the operation of the vehicle. The computer 23 may also be connected to the computer 10 via a direct link 7 (for example using CAN, FTP or Ethernet protocol) and to the gateway computer via an onboard communications bus 8.

The onboard client computer 10 and at least one of the onboard computers 21, 22, 23 connected to the onboard bus 5, notably the onboard computer 21, host a distributed computer program, comprising programming instructions for implementing the updating method explained hereinafter, when the distributed computer program is executed by the computers on which it is hosted.

The steps of the method described in the following figures are divided into three phases, namely the first phase for exchanges between a remote server 101 and the onboard client computer 10, containing steps for pre-downloading descriptive data and for downloading the digital contents as determined by the descriptive data, notably illustrated in FIG. 2, the second phase for exchanges between the onboard client computer 10 and one type of onboard computer 20,30,23, (indirectly via the gateway computer 21 for the computers of the second or third type) containing steps for distribution and for installation of the digital contents, notably illustrated in FIGS. 3 and 4 and 5 depending on the type of computer, the third phase for exchanges between the onboard client computer 10 and a type of onboard computer 20,30, 23, (indirectly via the gateway computer 21 for the computers of the second or third type) containing steps for activation of one or more onboard computers 20, 30, 23 updated, notably illustrated in FIGS. 6 and 7 depending on the type of computer. Only the first phase of the method requires a connection to the outside world via a telecommunications network, the other phases being executable when disconnected from the outside world.

Figure 2:
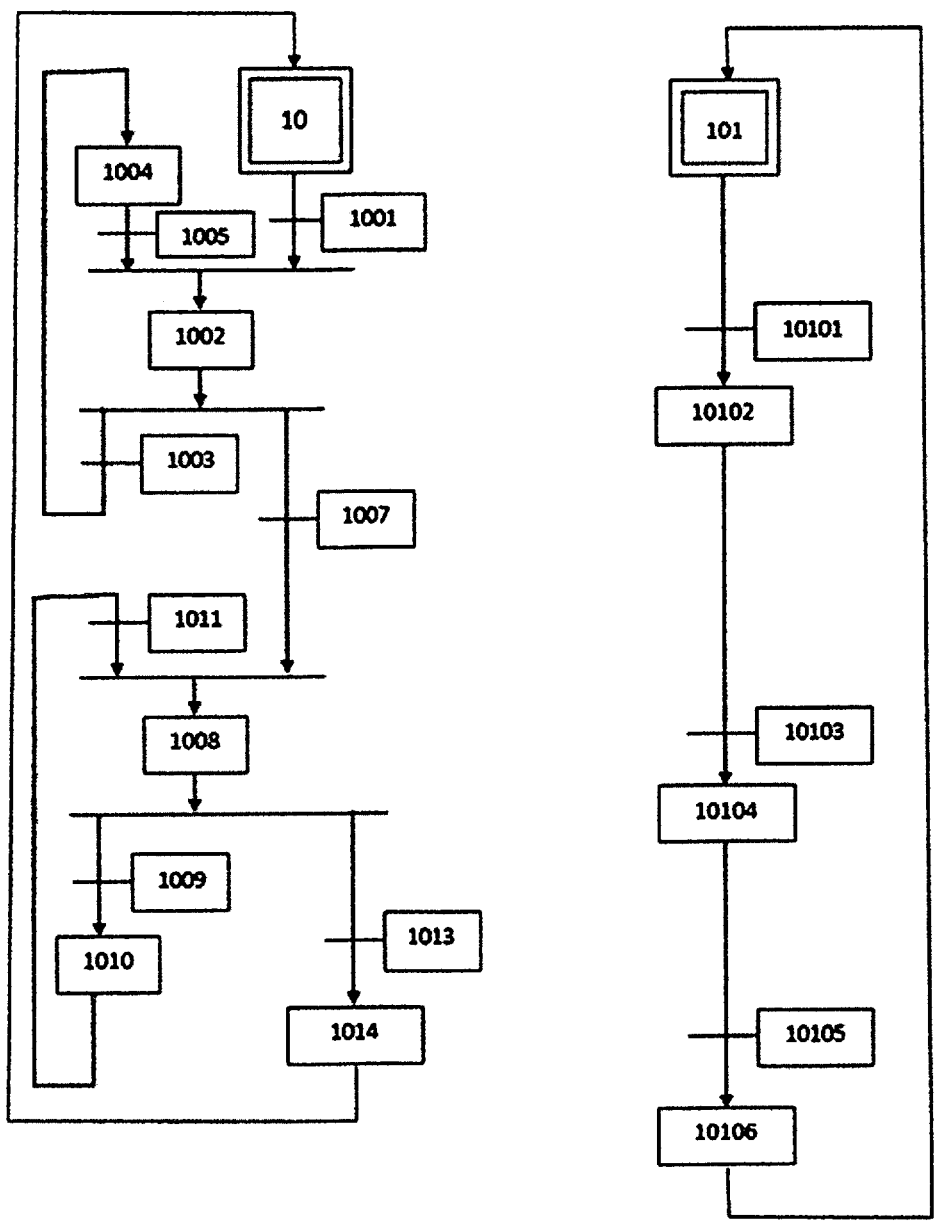
FIG. 2 shows steps of a pre-download sequence and of a download sequence within the method according to the invention.

FIG. 2 shows steps of the method according to the invention for performing a pre-download and a download of digital content from a remote download server 101.

Starting from a first standby step of the method executed in the onboard computer 10, a transition 1001 is validated when the existence of an update to be carried out is notified, notably via a software application for interface with the outside world in the memory of the onboard client computer 10, by the remote server 101 and when the vehicle 4 is under satisfactory conditions for carrying out a pre-download. The onboard client computer 10 constitutes an onboard download client computer as regards the method for updating a digital system described. The existence of an update to be carried out results from an upstream process furthermore known per se. The fact that the vehicle 4 disposes of a sufficient level of connectivity to a telecommunications network generates a satisfactory condition for performing a pre-download. A state of the vehicle 4, when it has an electric or rechargeable hybrid drive, in which it is connected to an electrical supply system for battery recharging, or if it is moving, in which it is in a deceleration phase, generates a satisfactory condition for performing a pre-download. A state of the vehicle 4, when it has a thermal or hybrid engine drive, in which its internal combustion engine is running, generates a satisfactory condition for performing a pre-download, whether the vehicle is moving or stationary.

A validation of the transition 1001 makes the method go to a step 1002 which consists in pre-downloading descriptive data for content to be downloaded. These descriptive data, notably in the form of metadata as a file.xml, comprise for example the VIN number (Vehicle Identification Number), the address of the digital contents to be downloaded (for example a URL), the scheduling list of the contents to be downloaded, configuration metadata notably specifying the mode of interaction: no user intervention (background) or with user intervention (foreground). At the step 1002, the onboard client computer 10 begins by sending a pre-download request to the server 101, then stores the content descriptive data as it arrives in a buffer memory. The pre-download request notably contains a VIN number of the vehicle 4 to which the onboard computer 10 belongs. The onboard client computer 10 notably verifies that the descriptive data received indeed corresponds to the specifications of the vehicle identified by the VIN number.

Starting from a second standby step of the method executed in the server 101, a transition 10101 is validated when the server receives the pre-download request raised by the onboard client computer 10 at the pre-download step 1002.

A validation of the transition 10101 makes the method go to a step 10102 which consists in sending out the descriptive data for the content to be downloaded to the onboard computer 10. By way of illustration, the remote server 101 may use the FTP protocol for transferring the descriptive data in the form of a file or UDP over an available electromagnetic wave telecommunications channel, 802.11, cellular telephone network, ad hoc network (WANET, MANET, VANET, etc.) or other, the most appropriate depending on whether the vehicle is stationary or moving, and/or depending on the environment of the vehicle 4, in other words telecommunication means available in its local area. A wired telecommunications channel (802.3 over Ethernet cable or via Powerline Networks) may also be used for example on an electric vehicle when it is connected to a battery recharging station.

In parallel with the step 10102 for sending out descriptive data executed in the server 101, the step 1002 executed in the onboard computer 10 consists in storing in an internal memory the files or frames received from the server 101 directly via a communications channel 1 over a telecommunications coupler specific to the onboard computer 10, or indirectly via another cellular telephone network core server 102, another onboard computer 11 (IVC) dedicated to telecommunications and an onboard bus 5.

Starting from the pre-download step 1002, a transition 1003 is validated in the case of a loss by the vehicle 4 of a satisfactory condition for carrying out a pre-download. The loss of a satisfactory condition may result from a loss of connectivity with the telecommunications network, for example when the vehicle enters into a tunnel or into an area with weak network coverage. The loss of a satisfactory condition may result from the internal combustion engine being turned off when the vehicle 4 has a thermal engine or is a non-rechargeable hybrid vehicle, for example when the driver leaves the vehicle to go and buy a loaf of bread. An interruption of battery power supply may also constitute a loss of a satisfactory condition.

A validation of the transition 1003 makes the method go to a step 1004 which consists in putting the onboard computer into a state waiting for satisfactory conditions to carry out a pre-download. In the case of a battery power supply interruption, the onboard client computer 10 may use a method of the STR (acronym for Suspend To RAM) type relating to the management of the energy allowing the execution of the processes to be suspended and their state to be stored in order to restore them to the identical state after switching off the onboard computer.

Starting from the step 1004, a transition 1005 is validated when all the satisfactory conditions for the pre-download are recovered: reconnection to a telecommunications network for example upon exiting a tunnel, restarting of the thermal engine, for example upon the return of the driver with his loaf of bread.

A validation of the transition 1005 makes the method return to the step 1002 which consists in informing the server 101 of its availability and in continuing with the storage of the descriptive data sent by the server 101. During the interruption of reception by the onboard computer at the step 1004, the server 101 simply remains in the wait step 10102 in the usual manner provided for in the FTP and UDP protocols so as to restart the transmission at the point where it had been interrupted.

Starting from the pre-download step 1002, a transition 1007 is validated when all the descriptive data have been stored in the buffer memory of the onboard computer 10.

A validation of the transition 1007 makes the method go to a step 1008 which consists in downloading digital contents comprising descriptive data characterizing them (notably security data notably linked to the secure contents destined for the computers of the first type (in a non-secured area) or for a gateway computer 21 with a view to the update of a computer of the second or hybrid type (in this case, these data contain for example information on the addressee of the update, on the target of the update, on the size, etc.), and for example in sending the pre-downloaded configuration descriptive data to the module for managing the dynamic configurations HMI-proxy (in this case these data contain, as previously mentioned, configuration metadata notably determining the mode of interaction without user intervention (background) or with user intervention (foreground)). At the step 1008, the onboard client computer 10 starts by sending a download request to the server 101, for example on the FTP port of the onboard computer 10 when the FTP protocol is used, or via another port depending on the type of communication (Wifi, Ethernet, etc.).

Starting from the step 10102 of the method executed in the server 101, a transition 10103 is validated when the server receives the download request sent by the onboard client computer 10 at the step 1008.

A validation of the transition 10103 makes the method go to a step 10104 which consists in sending the required contents to the onboard computer 10. By way of illustration, the remote server preferably uses a protocol of the FTP type for transferring the contents in the form of one or more files over an available telecommunications channel in a similar manner to the operating procedure of the step 10102.

In parallel with the step 10104 executed in the server 101, the step 1008 is executed in the onboard computer 10, in a manner comparable to the pre-download step 1002 with storage in the internal buffer memory. The use notably of the FTP protocol over a port of the IVI system allows an execution in parallel without interruption with steps of other telecommunications processes over other ports or using other protocols. For example, if the onboard client computer 10 receives frames associated with a remote or local diagnostic procedure, executed in parallel, over the onboard bus 5, coming from the onboard computer 11 or from a diagnostic OBD socket, the frames are simply switched, notably internally, to the onboard client computer 10 with no need to interrupt the step 1008 at any time. During the download, the computer 10 makes various checks on the downloaded files, such as for example verifications of conformity of the files to the content descriptive data previously received at the pre-download step 1002, and/or known parity checks on frames received for conveying the downloaded files.

Starting from the step 1008, a transition 1009 is validated in the case of a loss by the vehicle 4 of a satisfactory condition for carrying out a download. The loss of a satisfactory condition may, here again, result from a loss of connectivity to the telecommunications network, from the internal combustion engine being turned off when the vehicle 4 has a thermal engine or is a non-rechargeable hybrid vehicle, or from a disconnection from a battery charging station when the vehicle 4 has an electric drive. The transition 1009 may also be validated in the case of a negative check on a downloaded file.

A validation of the transition 1009 makes the method go to a step 1010 which consists in putting the onboard computer into a state waiting for satisfactory conditions for continuing to perform the download. At the step 1010, the computer 10 keeps a pointer on the last file correctly downloaded.

Starting from the step 1010, a transition 1011 is validated when all the satisfactory conditions for the download are recovered, for example: reconnection to a telecommunications network, restarting of the internal combustion engine for a thermal vehicle, reconnection to a battery charging station for an electric vehicle, like at the step 1005.

A validation of the transition 1011 makes the method return to the step 1008 which consists in informing the server 101 of its availability and in carrying out the storage of the files sent by the server 101. Upon its return to the step 1008 by validation of the transition 1011, the onboard client computer 10 sends, to the server 101, a reference of the last file correctly downloaded, whether this is following an interruption of satisfactory conditions of the vehicle or following a negative check on a file in the process of being downloaded. During the interruption of reception by the onboard computer at the step 1010, the server 101 simply remains in a wait state at the step 10104, in the usual manner provided in the protocols of the FTP type, so as to continue with the transmission at the point where it was interrupted as soon as the onboard computer 10 becomes available, in order to send the file to be downloaded following the last file correctly downloaded.

Starting from the step 1008, a transition 1013 is validated when the download having finished is notified to the onboard client computer 10 by the remote server 101; the downloaded files therefore comprise all the new digital content of the update, this content therefore being complete.

A validation of the transition 1013 makes the method go to a step 1014 which consists in sending to the server 101 an acknowledgement of safe receipt preferably accompanied by a report on the download carried out. After sending the acknowledgement of safe receipt, accompanied—depending on the particular implementation—by the report on the download carried out, the computer 10 returns to the standby step of the method, in other words waiting for the next transition of the method.

It will be noted that the steps executed by the onboard client computer 10, from the transition 1001 to the transition 1013, may be interrupted numerous times by the transitions 1003 and/or 1009, without interfering with the operation of the vehicle 4. Indeed, both the pre-download and download phases are limited to a storage in the vehicle, for example here in the onboard computer 10, of the content useful for the update of the digital system. It is of little importance whether the implementation of the steps 1002 to 1014 lasts a few minutes or several days, because the steps 1002 to 1014 are executed in hidden time with respect to the operation of the vehicle. Both phases of the method that have just been described hereinabove are thus implemented in a mode connected to the outside world with no risk for the state of charge of the electrical battery or batteries of the vehicle, recharged by the rotating internal combustion engine for a thermal or hybrid vehicle, or recharged by the recharging station to which the electric or rechargeable hybrid vehicle is connected.

Starting from the step 10104, a transition 10105 is validated when the server 101 receives the acknowledgement of safe receipt, accompanied—depending on the particular implementation—by the report on the download carried out.

A validation of the transition 10105 makes the method go to a step 10106 which consists in logging the acknowledgement of safe receipt, accompanied—depending on the particular implementation—by the report on the download carried out, in a log of download states for a set of vehicles managed by the server 101 as regards updates of digital systems within said vehicles. The server 101 subsequently returns to the standby step for the steps of the method described hereinabove, in a manner furthermore known per se for the servers usually capable of handling several processes in parallel.

Furthermore, at least one of said steps of the method for updating a digital system may comprise a sub-step for interaction between the human-machine interface apparatus 12 and the user via the human-machine interface apparatus 12 according to a specific mode of interaction, notably depending on said step in progress. For this purpose, as previously mentioned, the pre-downloaded descriptive data may comprise metadata (of the xml type for example) for configuration of the human-machine interface apparatus 12. These configuration metadata are transmitted by the onboard client computer 10 to the human-machine interface apparatus 12 via direct internal link (shown, but not referenced) and stored in a module for managing dynamic configurations, also called HMI proxy, at the end of the step 1008. Furthermore, preferably, the human-machine interface apparatus 12 is hosted by the onboard client computer 10. The configuration metadata characterize the digital content for updating an onboard computer owing to the fact that they define the mode of interaction between the human-machine interface apparatus 12 and the user during the steps for distribution, for installation and for activation of the associated digital content. Indeed, for each step of the update and depending on the digital content, a diversified policy for managing the update campaigns may thus be defined upstream in an off-board manner and thus provide modes of interaction between the human-machine interface apparatus 12 and the user via the human-machine interface apparatus 12 that are different depending on the update in question and on the step in progress for updating the digital system.

Indeed, since the onboard client computer 10 is involved throughout the method for distribution, installation and activation of the contents, it is aware of the step of the update under way. Thus, depending on the update and on the installation step in progress, the various modes of interaction with the user, notably by means of a screen of the human-machine interface apparatus 12, for example take the form of an authorization which may be requested from the user by means of a virtual button displayed on the HMI which the user will have to push, or of information to the user in the form of text, or else be invisible to the user, for example where a campaign is critical. Moreover, the configuration metadata characterizing the digital content for updating an onboard computer may also define the vehicle conditions required for triggering the interaction between the human-machine interface apparatus 12 and the user. For example, if the installation phase is finished during a mission, which is very probable, the condition will impose for example that the engine be turned off and the mode of interaction by asking for consent will only therefore be offered to the user in the activation phase at the end of the mission, in other words at the end of the journey, once the engine has been turned off.

Figure 3:
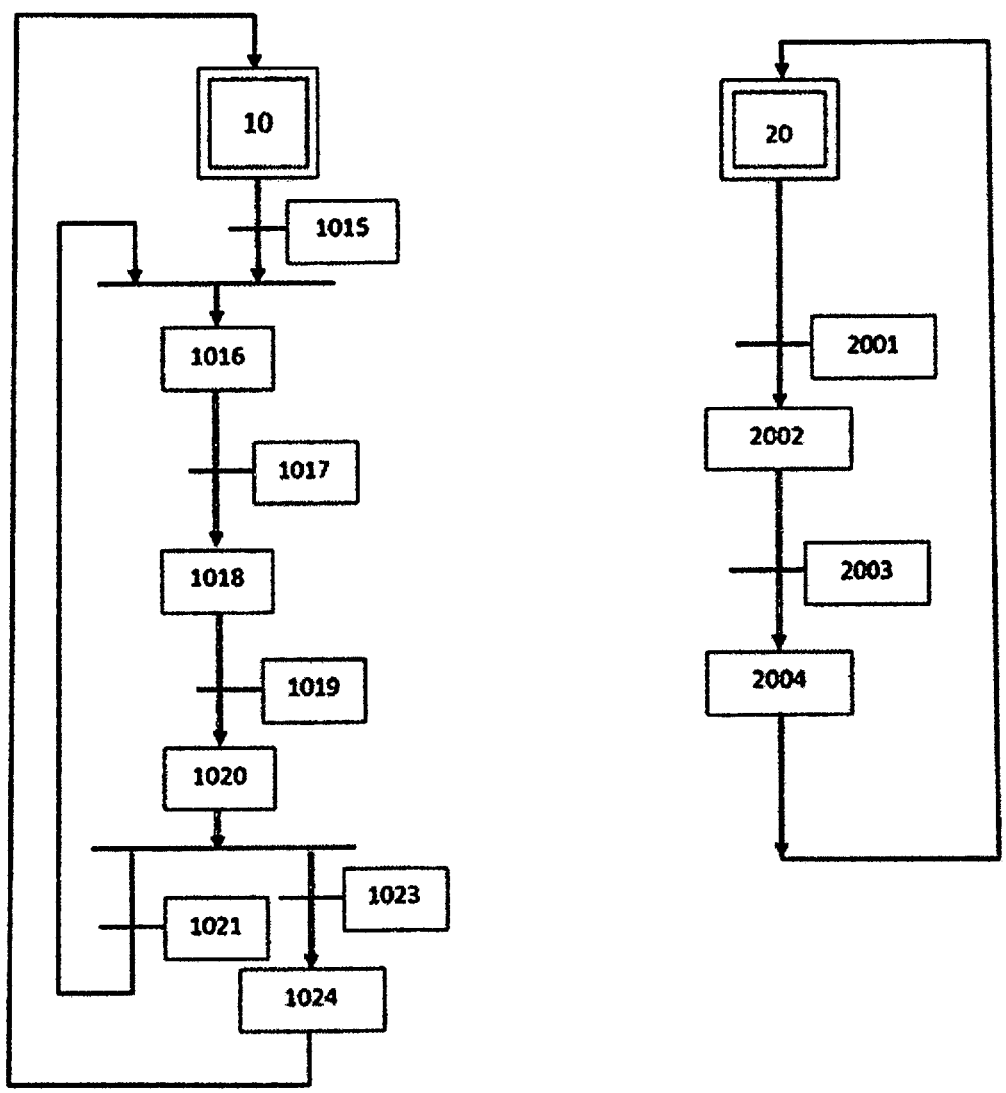
FIG. 3 shows distribution and installation steps for a first type of onboard computer.

FIG. 3 shows steps of the method according to the invention for implementing a distribution and an installation of digital content within the digital system (on board) using the onboard client computer 10. The steps now described are executed disconnected from the outside world (off board). More precisely, the distribution and installation phase illustrated in FIG. 3 are carried out with a view to updating a first type of onboard computer 20 corresponding to one of the onboard computers 11, 21, 22 directly connected to the onboard bus 5 to which the onboard client computer 10 is connected. The latter 11, 21, 22 are each equipped with data processing resources that are sufficient for processing the downloaded content addressed to it.

Consecutively to the step 1014 for sending an acknowledgement of safe receipt of the method executed in the onboard computer 10, a transition 1015 is validated when the existence of a complete digital content for updating an onboard computer is notified in the memory of the onboard client computer 10 by internal notification and when the vehicle 4 is in a satisfactory condition for carrying out a distribution and an installation of the digital contents within the digital system. This complete digital content notably takes the form of a list of the downloaded digital contents, with the understanding that the sequencing of the contents in the list is not in an order necessarily linked to the types of computers. For example, two contents which follow each other may be intended for computers of different types (just like the following sequencing: first type then second type then first type then second type then third type then second type, for example). The two phases of the method relating to the distribution and to the installation of the contents in one or more onboard computers do not require a connection with the outside; the vehicle 4 is in a satisfactory condition when the vehicle 4 is able to power the computers of the digital system concerned by the distribution and the installation of content, in other words for example able to maintain a sufficient level of charge in the batteries: internal combustion engine running for a thermal vehicle, batteries connected to a charging station for an electric vehicle.

A validation of the transition 1015 makes the method go to a step 1016 in which the onboard client computer 10 distributes a first downloaded digital content in the internal buffer memory to the internal buffer memory of the onboard computer 20. At the step 1016, the onboard client computer 10 begins by defining the onboard computer addressee of the digital content by reading the descriptive data for the content which characterize said content, then sends a distribution request to the addressee onboard computer, then starts to distribute the digital content to this computer. Indeed, here the target computer intended to be updated by this digital content is of the first type 20, namely one of the computers 11, 21, 22 connected to the client computer 10 directly via the onboard bus 5 and de facto the computer addressee of the digital content is identified as being the target computer in question 11, 21, 22.

In parallel, in the addressee computer 20, a transition 2001 is validated when it 20 receives the distribution request sent by the onboard client computer 10 at the distribution step 1016. By way of illustration, the onboard client computer 10 may use the CAN or FTP protocols for distributing the digital content (in this case, this content here is rendered secure (encapsulation(s)) since this computer is not in a secure area and comprises downloaded descriptive data for security protection) to the addressee computer 20, in this case via the onboard bus 5, independently of the level of connectivity to a telecommunications network since these steps are executed disconnected from the outside world. A validation of the transition 2001 makes the method go to a step 2002 which consists in storing the digital content in the addressee computer 20.

In parallel with the step 1016 for distribution of the digital content executed by the client computer 10, the step 2002 for storage of the digital content is executed in the addressee computer 20; this involves de-encapsulating the secure content then verifying that the content is indeed intended for said computer 20 (otherwise, as for any case of a failure during a step, it is rejected and the memory is erased, as described for the activation phase in the following part of the text, in this case the buffer memory) then storing in an internal buffer memory of the addressee computer 20 the files or frames received from the client computer 10 via the onboard bus 5.

Starting from the distribution step 1016, a transition 1017 is validated when the distribution of the digital content ended is notified to the client computer 10 by the onboard addressee computer 20, here via the bus 5. Indeed, although the client computer 10 knows when it has finished distributing, the notification from the addressee computer 20 confirms to it that everything has indeed been received.

A validation of the transition 1017 makes the method go to a step 1018 which consists in sending an installation request to the addressee computer 20. At the step 1018, the onboard client computer 10 sends an installation request to the addressee computer 20 via the onboard bus 5.

Starting from the storage step 2002 executed in the addressee computer 20, a transition 2003 is validated when the addressee computer 20 receives the installation request sent out by the onboard client computer 10 at the step 1018.

A validation of the transition 2003 makes the method go to a step 2004 which consists, for the addressee computer 20, in directly installing for itself the digital content previously stored in its internal buffer memory, then notably in notifying to the client computer 10 when the installation has finished. Installing is understood to mean preparing for the future activation, in other words here, if the addressee computer 20 is dual bank, the new digital content in the inactive bank is copied into it and, if the computer only disposes of a buffer memory, there is nothing more to be done.

Starting from the installation request step 1018 executed in the client computer 10, a transition 1019 is validated when the installation ended is notified to the client computer 10 by the onboard addressee computer 20 via the bus 5, notably by means of the receipt of the notification of completion of installation sent out by the addressee computer 20. The installation of the digital content in the addressee computer 20 is therefore complete.

The validation of the transition 1019 makes the method go to a step 1020 which consists in verifying if there exists or not another digital content to be installed in the digital system.

If there exists another digital content to be installed in the digital system, in other words on an onboard computer 11, 21, 22, the transition 1021 is validated when another digital content to be installed is detected in the list of the downloaded digital contents. The validation of the transition 1021 makes the method loop back to the step 1016.

If there is no other digital content to be installed in the digital system, in other words the last digital content from the list of the downloaded digital contents has just been installed, the transition 1023 is validated and makes the method go to a step 1024 which consists in going to the phase for verifying the conditions for activation of the digital contents for the update campaign underway and sending of a notification of end of installation to the module for managing the dynamic configurations HMI-proxy. This request to the HMI-proxy will determine the conditions of activation required depending on the digital contents and/or on the computers, in other words for example the need or otherwise for user authorization, dynamic conditions predefined upstream, notably at the creation of the campaign.

After this distribution and installation phase for a first type of computer, the computer 10 returns to the standby step of the method which may consist in waiting for the end of mission or for example waiting for the end of mission combined with a user authorization notably, but it will not be able to return to the distribution phase as long as the method is not finished, in other words as long as the update campaign has not ended.

Figure 4:
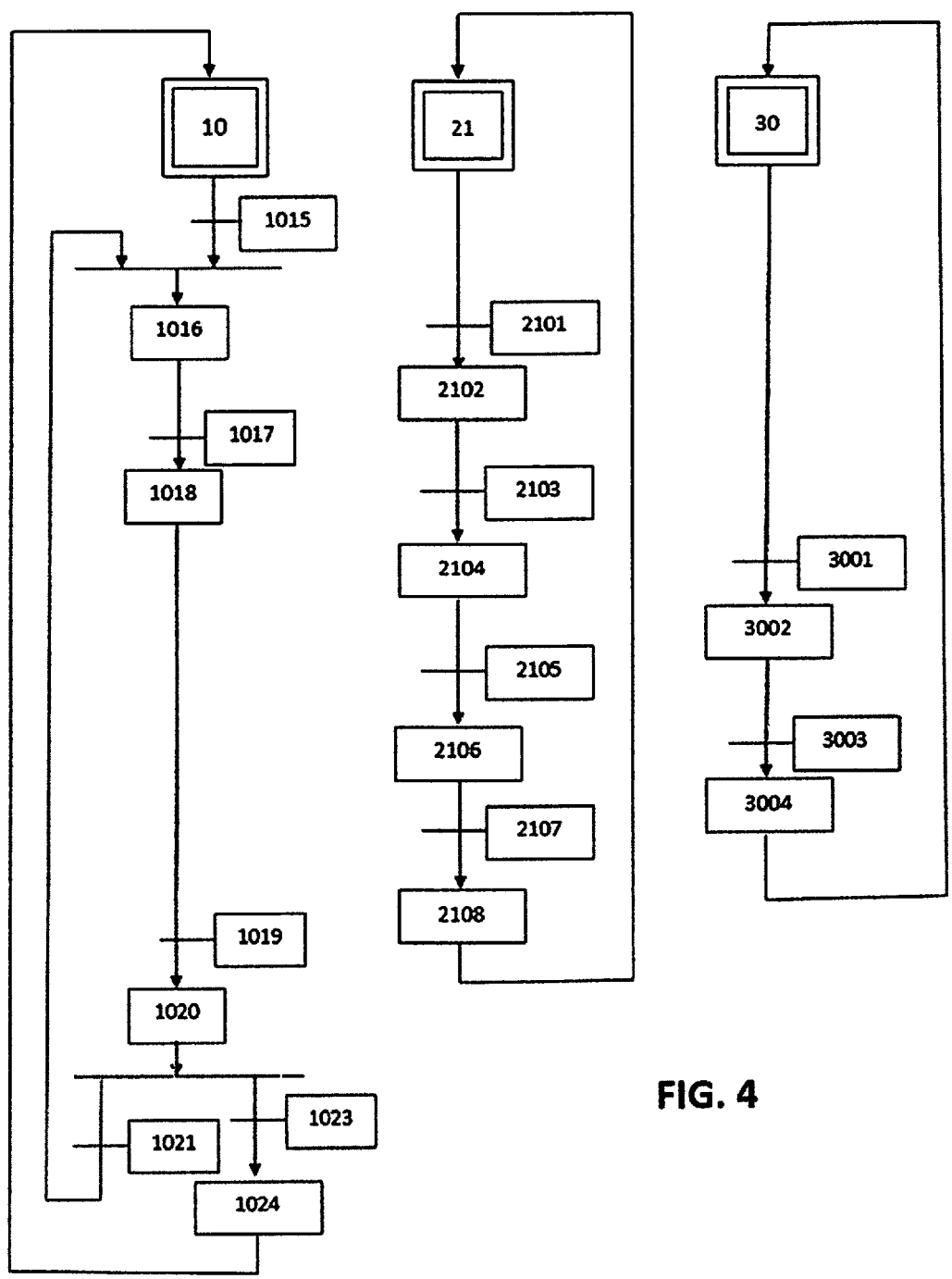
FIG. 4 shows distribution and installation steps for a second type of onboard computer.

FIG. 4 shows steps of the method according to the invention for carrying out a distribution and an installation of digital content within the digital system (on board) using the onboard client computer 10. The steps now described are also executed disconnected from the outside world (off board). More precisely, the distribution and installation phases illustrated in FIG. 4 are carried out with a view to updating a second type of onboard computer 30 corresponding to a computer indirectly connected to the onboard client computer 10 through the gateway computer 21 and equipped with data processing resources sufficient for processing the downloaded content intended for it, here one of the onboard computers 31, 32, 33 connected to the second onboard bus 6.

Consecutively to the step 1014 for sending an acknowledgement of safe receipt of the method executed in the onboard computer 10, a transition 1015 is validated when the existence of a complete digital content for updating an onboard computer is notified in the memory of the onboard client computer 10 and when the vehicle 4 is in a satisfactory condition to perform a distribution and an installation of digital content within the digital system. As already mentioned, this complete digital content notably takes the form of a list of the downloaded digital contents, with the understanding that the sequencing of the contents in the list is not in an order necessarily linked to the types of computers. Since the two phases of the method relating to the distribution and to the installation of digital contents in one or more onboard computers do not require a connection with the outside, the vehicle 4 is in a satisfactory condition when the vehicle 4 is able to power the computers of the digital system concerned by the distribution and the installation of content, in other words for example able to maintain a sufficient level of charge in the batteries: internal combustion engine running for a thermal vehicle, batteries connected to a charging station for an electric vehicle.

A validation of the transition 1015 makes the method go to a step 1016 in which the onboard client computer 10 distributes a first downloaded digital content in the internal buffer memory to the onboard computer 21. At the step 1016, the onboard client computer 10 begins by defining the onboard computer addressee of the digital content by reading the descriptive data for the content, then sends a distribution request to the onboard addressee computer 21 then starts to distribute the digital content to it. Indeed, here the target computer intended to be updated by this digital content is of the second type 30, namely one of the computers 31, 32, 33 on the onboard bus 6 and connected to the client computer 10 via the gateway computer 21 and de facto the computer addressee of the digital content is identified as being the gateway computer 21.

In parallel, in the gateway computer 21, a transition 2101 is validated when it 21 receives the distribution request sent out by the onboard client computer 10 at the distribution step 1016. By way of illustration, the onboard client computer 10 may for example use the CAN, FTP or Ethernet protocols for distributing the digital content to the gateway computer 21, here via the onboard bus 5, independently of the level of connectivity to a telecommunications network since these steps are executed disconnected from the outside world. A validation of the transition 2101 makes the method go to a step 2102 which consists in storing the digital content in the gateway computer 21.

In parallel with the distribution step 1016 for the digital content executed by the client computer 10, the step 2102 for storing the digital content is executed in the gateway computer 21, which involves storing in the internal buffer memory of the gateway computer 21 the files or frames received from the client computer 10 via the onboard bus 5.

In parallel, starting from the distribution step 1016 of the method executed in the client computer 10, a transition 1017 is validated when the completion of the distribution of the digital content to the addressee computer gateway 21 is notified to the client computer 10 by the gateway computer 21, in this case via the bus 5.

A validation of the transition 1017 makes the method go to a step 1018 which consists in sending an installation request to the target computer 30. At the step 1018, the onboard client computer 10 sends an installation request to the addressee computer gateway 21, in this case via the onboard bus 5. Indeed, this digital content appears according to its descriptive data as a content destined for the gateway computer 21, the client computer 10 is not therefore in direct contact with the target computer, but with the gateway computer 21 and the latter will activate the computers 30 as explained in the following.

Starting from the storage step 2102 executed in the gateway computer 21, a transition 2103 is validated when the gateway computer 21 has received the installation request sent at the step 1018.

The validation of the transition 2103 therefore makes the method go to a step 2104 in which the onboard gateway computer 21 defines the target computer 30 for the content (according to the descriptive data for the secure content) and distributes the digital content to it 30 that it 21 had stored in the internal buffer memory. At the step 2104, the onboard addressee gateway computer 21 begins by sending a distribution request to the defined target computer 30, here via the onboard bus 6, then starts to distribute the digital content to this target computer 30. Indeed, here the target computer intended to be updated by this digital content is of the first type 30, namely one of the computers 31, 32, 33 connected to the gateway computer 21, notably via the onboard bus 6.

In parallel, starting from a standby step of the method executed in the onboard target computer 30, a transition 3001 is validated when the gateway computer 30 receives the distribution request raised by the gateway computer 21 at the distribution step 2104. By way of illustration, the onboard gateway computer 21 may use the CAN, FTP or Ethernet protocols for distributing the digital content to the target computer 30 via the onboard bus 6, independently of the level of connectivity to a telecommunications network since these steps are executed disconnected from the outside world. A validation of the transition 3001 makes the method go to a step 3002 which consists in storing the digital content in the target computer 30.

In parallel with the distribution step 2104 for the digital content executed by the gateway computer 21, the step 3002 for storing the digital content is executed in the target computer 30, which involves storing, in the inactive internal memory in the case of a dual-bank target computer 30 or otherwise in the external memory of the target computer 30, the files or frames received from the gateway computer 21, here via the onboard bus 6. It should be noted that the storage in the external memory does not occupy all the external memory, but only a part of the external memory, which allows both the current digital content, in other words of a past version (but still active at this step of the method), since the latter has not been erased, and this new digital content for the update to be stored simultaneously in the external memory of the addressee computer. This storage in the external memory of the past content will allow it, in the following part of the method, during the activation phase, to be saved for a potential backtracking if needed.

Starting from the distribution step 2104 of the method executed in the gateway computer 21, a transition 2105 is validated when the end of the distribution of the digital content is notified to the gateway computer 21 by the onboard target computer 30, in this case via the bus 6.

A validation of the transition 2105 makes the method go to a step 2106 which consists, for the gateway computer 21, in sending an installation request from the target computer to the target computer 30. At the step 2106, the onboard gateway computer 21 sends an installation request from the target computer to the target computer 30, in this case via the onboard bus 6.

Starting from the storage step 3002 executed in the target computer 30, a transition 3003 is validated when the target computer 30 receives the installation request from the target computer raised by the gateway computer 21 at the step 2106.

A validation of the transition 3003 makes the method go to an installation step 3004 which consists, for the target computer 30, in instigating the saving of the current content by copying, either, depending on the nature of the memory of the computer 30, the missing elements, namely those of the current content which do not change with the update, in the inactive bank in the case of a dual-bank internal memory, or, in the case of an external memory, by copying the entirety of the digital current content in the external memory of the target computer 30, then notably in notifying to the gateway computer 21 the completion of the installation. Installing is understood to mean preparing for the future activation, and notably for a computer of the second type 30 with an external memory, this involves saving the current content in it so as to allow a potential backtracking. Indeed, in the case of a dual bank, a simple switching suffices and avoids having to save via a third-party copy. De facto, if the target computer 30 is dual bank, the elements of the current content of the computer 30 present in the active bank, which have not been the object of the update and do not therefore appear in the new digital contents, are copied into the inactive bank, and if the target computer 30 only disposes of an external memory, all of the elements of the current content of the computer 30 (present in the current active memory) are copied into it.

Starting from the installation step 2106 executed by the gateway computer 21, a transition 2107 is validated when the installation finished is notified to the gateway computer 21 by the onboard target computer 30, in this case via the bus 6, notably by means of the receipt of the notification of completion of installation sent out by the target computer 30. The installation of the digital content in the target computer 30 is therefore completed without error.

A validation of the transition 2107 makes the method go to a step 2108 which consists in sending, depending on the notification of completion of installation, to the client computer 10 the status (correct or incorrect) of the installation for the target computer 30. After sending the status, the gateway computer 21 returns to the standby step of the method.

Starting from the installation step 1018 executed by the client computer 10, a transition 1019 is validated upon receipt of the installation correct status sent out by the gateway computer 21.

The validation of the transition 1019 makes the method go to a step 1020 which consists in verifying if there exists or not another digital content to be installed in the digital system.

If there exists another digital content to be installed in the digital system, in other words on an onboard computer whichever it is 20, 30, 23, the transition 1021 is validated when another digital content to be installed is detected in the list of the downloaded digital contents. The validation of the transition 1021 makes the method loop back to the step 1016.

If there is no other digital content to be installed in the digital system, in other words the last digital content from the list of the downloaded digital contents has just been installed, the transition 1023 is validated and makes the method go to a step 1024 which consists in going into a phase for verification of the conditions of activation of the digital contents for the update campaign in progress by sending a notification of end of installation to the module for managing the dynamic configurations HMI-proxy. As previously described in FIG. 3, this request to the HMI-proxy will determine the conditions of activation required depending on the digital contents and/or on the computers, in other words for example the need or otherwise for a user authorization.

After this distribution and installation phase for a second type of computer, the computer 10 returns to the standby step of the method, which therefore involves waiting for the activation conditions, but it will not be able to return to the distribution phase as long as the method is not completed, in other words as long as the update campaign is not finished.

Figure 5:
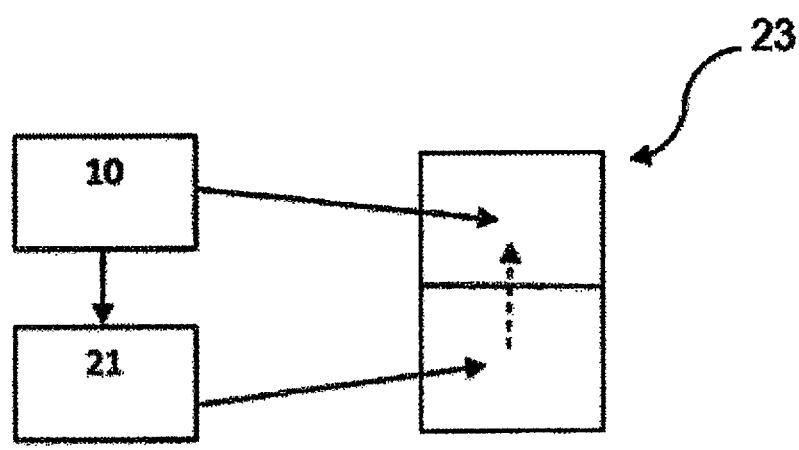
FIG. 5 shows the distribution and installation diagram for a third type of onboard computer.

FIG. 5 illustrates schematically the method according to the invention for carrying out a distribution and an installation of digital content within the digital system (on board) using the onboard client computer 10. As previously, the steps now described are executed disconnected from the outside world (off board). More precisely, the distribution and installation phase, subject of FIG. 5, is carried out with a view to updating a third type of onboard computer 23 of the hybrid type corresponding to the onboard computer 23 which, in this case, is a display. This third type of computer is referred to as hybrid because it comprises two processors and each processor is considered as a computer of a different type, as shown in the Figure. Thus, a first processor is a computer of the first type and is connected to the onboard client computer 10, in this case via the secure link 7 (the onboard bus 5 connecting the hybrid computer 23 to the client computer 10 is not used here but could constitute a variant) whose port on the first processor is secure, and the second processor is a computer of the second type and is connected to the onboard gateway computer 21 via the bus 8. It should be noted that, preferably, for security reasons, and such as shown here, the direct link 7 is not always open, in other words that, advantageously, the secure communications port situated on the first processor is closed by default, preventing any communication of data via this link. Furthermore, this hybrid computer 23 could comprise other parts. This hybrid computer 23 is equipped with data processing resources sufficient for processing the downloaded content intended for it. Owing to its structure, the distribution and installation phase for content in a hybrid computer 23 implements the relevant steps such as previously described for a computer of the first type, in FIG. 3, and a computer of the second type, in FIG. 4, the update therefore comprising two distinct downloaded digital contents each characterized by its distinct descriptive data. Thus, the first content, secure, will designate an addressee computer 23, as if it were of the first type, and the second content an addressee gateway computer for an update of the target computer 23, as if it were of the second type.

Starting with the second content, the solid arrow between the client computer 10 and the gateway computer 21 represents the exchanges between these two computers during the distribution and installation phase for the second content for which the gateway computer 21 is the addressee, whereas the hybrid computer 23 is the target. Similarly, the solid arrow between the gateway computer 21 and the hybrid computer 23 represents the exchanges between these two computers during the distribution and installation phase for the second content for which the gateway computer 21 is addressee, whereas the hybrid computer 23 is the target. The steps of the method in question are therefore the same as those implemented for a computer of the second type such as described in FIG. 4.

This computer being of the third type, following the installation of this second content, an intermediate step is carried out in which the second processor sends a request for opening the secure port to the first processor, within the hybrid computer 23. This sending of a request for opening is illustrated by the dashed arrow between the gateway computer 21 and the hybrid computer 23. Once the port is open, the following steps of the distribution and installation phase for the first content may then take place as previously described in FIG. 3, in this case via the link 7.

The solid arrow between the client computer 10 and the first processor of the hybrid computer 23 represents the distribution and installation phase for the first content in the first part of the external memory of the hybrid computer 23 as addressee and target computer. The steps of the method in question are therefore the same as those implemented for a computer of the first type such as described in FIG. 3.

Following the distribution and installation phase, each target computer is up to date, which therefore means, for a computer of the first type, that it comprises the new digital content in its inactive internal bank or in its buffer memory and for a computer of the second type that it comprises the new digital content in its external memory or in its inactive internal bank, and hence both at the same time in the case of a computer of the third type.

Figure 6:
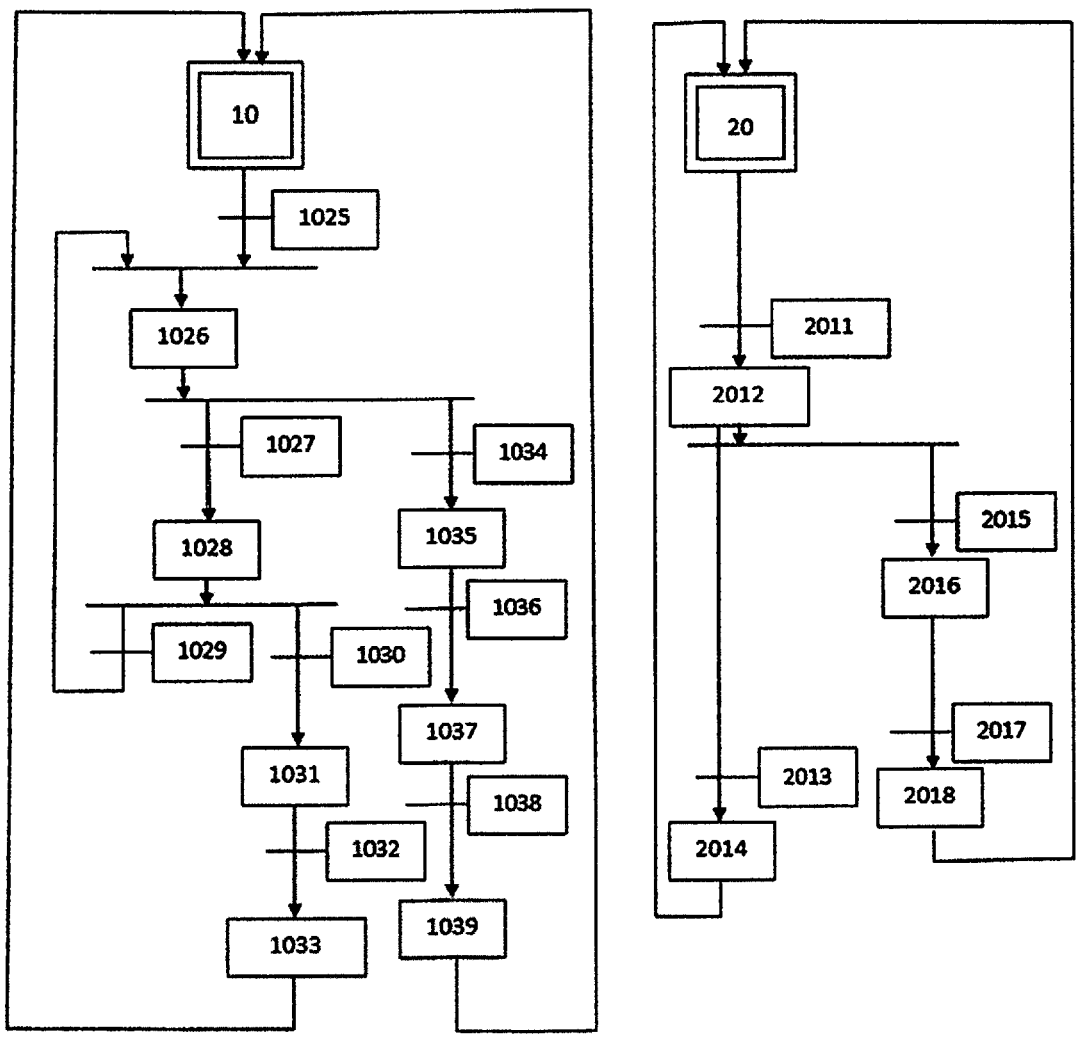
FIG. 6 shows activation steps for a first type of onboard computer updated.

FIG. 6 shows steps of the method according to the invention for carrying out the activation of an onboard target computer of the first type after installation. The steps now described are also executed disconnected from the outside world (off board). More precisely, the activation phase illustrated in FIG. 6 is carried out with a view to updating a first type of onboard computer 20 corresponding to one of the onboard computers 11, 21, 22 directly connected to the onboard bus 5, to which the onboard client computer 10 is connected, and each equipped with data processing resources sufficient for processing the downloaded content intended for it.

Consecutively to the step 1024 for sending a notification of the end of installation of the digital contents for the update campaign of the method executed in the onboard computer 10, a transition 1025 is validated when the vehicle 4 is in the activation conditions required by the update campaign. These conditions are determined by the module for managing the dynamic configurations HMI-proxy, based on the descriptive data (metadata) sent to the module for managing the dynamic configurations HMI-proxy. For example, each computer has its own activation conditions, amongst which some are common (end of mission) and some more precise (user authorization: foreground) notably in the case of the computers of the second type 30. A satisfactory condition for performing the activation of the update of the computer of the first type 20 may be generated by the fact, for the vehicle 4, of it being at the end of mission, in other words where the engine has just been turned off.

A validation of the transition 1025 makes the method go to a step 1026 which consists in triggering the activation of the onboard target computer (and addressee at the same time, since this computer is of the first type) 20. At the step 1026, the onboard client computer 10 begins by defining the onboard target computer 20 by reading the digital content characterized by its descriptive data which contain this indication, then sending an activation request to the onboard target computer 20. Indeed, here the target computer intended to be updated by this digital content is of the first type 20, namely one of the computers 11, 21, 22 connected to the client computer 10 directly via the onboard bus 5 and de facto the target computer for the digital content, hence to be activated, is identified as being the target computer in question 11, 21, 22.

In parallel, in the addressee computer 20, after the step 2004 for installation, directly for itself, of the onboard target computer 20, a transition 2011 is validated when the onboard target computer 20 receives the activation request raised by the onboard client computer 10 at the activation triggering step 1026. By way of illustration, the onboard client computer 10 may use the CAN, FTP or Ethernet protocols for sending the activation request to the addressee computer 20 via the onboard bus 5, independently of the level of connectivity to a telecommunications network, since these steps are executed disconnected from the outside world. A validation of the transition 2011 makes the method go to a step 2012 which consists in activating the digital content installed at the step 3004 in the addressee computer 20, then notably in notifying to the client computer 10 the completion of the activation, with the understanding that this notification may be a notification of success or a notification of failure of the activation. Activating is understood to mean, for a computer of the first type, going from the current content to the new content by switching in the case of a dual bank and otherwise by update of the internal current memory in the case of an internal buffer memory. In this case, this notification is routed by means of the bus 5.

Starting from the activation triggering step 1026 executed by the client computer 10, a transition 1027 is validated when the report of successful activation of the digital content, generated and sent by the onboard target computer 20 at the step 2012, is received by the client computer 10.

A validation of the transition 1027 makes the method go to a step 1028 which consists in generating an internal report on activation relating to the activated digital content in question and in verifying if there exists or not another digital content to be installed in the digital system.

Starting from the step 1028 executed in the client computer 10, a transition 1029 is validated if there exists another digital content to be installed in the digital system, in other words on an onboard computer 11, 21, 22, 30, 31, 32, 33 whichever it is. The transition 1029 is therefore validated when such another digital content to be installed is detected in the list of the downloaded digital contents. The validation of the transition 1029 makes the method loop back to the step 1026.

If there is no other digital content to be installed in the digital system, in other words the last digital content from the list of the downloaded digital contents has just been installed, the transition 1030 is validated and makes the method go to a step 1031 which consists, for the client computer 10, in sending a notification of end of campaign for the update in progress to the target computer 20. It is therefore after the successful activation of all the target computers 20, 30, 23 from the list that this notification of end of campaign is sent to each of the target computers 20, 30, 23. Each of the computers (except for the last) has accordingly waited in standby to receive this notification which confirms the success of all the activations of the update campaign. Indeed, this notification cannot be sent out beforehand in case one of the computers does not succeed in its activation, as will be explained in the following.

Starting from the activation step 2012 executed with success by the target computer 20, a transition 2013 is validated when the target computer 20 receives the notification of end of campaign sent by the client computer 10 at the step 1031.

A validation of the transition 2013 makes the method go to a step 2014 which consists in erasing the past digital content, henceforth inactive at this step of the method, and, once this erase operation is complete, in notifying the client computer 10 of the "ready for a new update" status of the target computer 20.

Starting from the step 1031 for sending a notification of end of campaign executed in the client computer 10, a transition 1032 is validated when the client computer 10 has received all the notifications of "ready" status sent by each target computer 20 or addressee computer 30 at the step 2014 or 2114.

A validation of the transition 1032 makes the method go to a step 1033 which consists in generating a global report of campaign success, the report generated being updated by successive aggregations at each "ready" status from a target computer 20 or addressee computer 21. Once all the notifications for each computer 20, 30, 23 from the list have been sent, the global report generated at this step 2014 will be complete, this report being subsequently transmitted to the remote server 101 or 102 (not shown in FIG. 6).

On the other hand, as soon as an activation results in a failure at the step 2012 for a target computer 20, following the activation triggering step 1026 executed by the client computer 10, a transition 1034 is validated when the notification of activation failure of the digital content, sent out by the onboard target computer 20 at the step 2012, is received by the client computer 10.

A validation of the transition 1034 makes the method go to a step 1035 which consists in triggering a general backtracking for all the computers of the digital system being subject to the update campaign. A general backtracking is understood to mean a return to the initial state prior to the start of the campaign. At the step 1035, the onboard client computer 10 begins by defining all the onboard addressee computers being subject to the update campaign, then in sending out a request for backtracking to each of these onboard addressee computers 20, 21, 23 defined. In this case, the target computer defined and hence having to carry out the backtracking is of the first type 20, namely one of the computers 11, 21, 22 connected to the client computer 10 directly via the onboard bus 5.

In parallel, in the addressee computer 20, the transition 2015 is validated when the onboard target computer 20 receives the backtracking request sent out by the onboard client computer 10 at the step 1035. In this case, this notification is routed by means of the bus 5. It should be recalled that, at this step of the method, the past digital content (which is henceforth inactive if the activation of the new replacement content has succeeded, and still active otherwise) is still present in the external memory of the target computer 20, the latter not being erased, and the new digital content of the update, henceforth activated if its activation was successful.

A validation of the transition 2015 makes the method go to a step 2016 which consists in effecting the backtracking, in other words in re-activating the past digital content, hence rendering the new digital content inactive if it wasn't already, and once this backtracking has been completed in notifying it to the client computer 10.

Starting from the backtracking triggering step 1035 executed in the client computer 10, a transition 1036 is validated when the client computer 10 receives the notification of completion of backtracking sent by the target computer 20 at the step 2016.

A validation of the transition 1036 makes the method go to a step 1037 which consists in generating a report of campaign failure then, once this report is complete, in notifying the end of campaign to the target computer 20, the report generated being updated by successive aggregations at each target computer 20 having effected its backtracking. Once all the notifications from all the target computers defined at the step 1035 have been received, the report of campaign failure generated at this step 1037 will be complete, and the notification of end of campaign sent to each of the target computers defined at the step 1035.

In parallel, in the addressee computer 20, the transition 2017 is then validated when the onboard target computer 20 receives the notification of end of campaign sent out by the onboard client computer 10 at the step 1037. In this case, this notification is routed by means of the bus 5. It should be recalled that, at this step of the method, the re-activated past digital content and the new inactive digital content are still present in the external memory of the target computer 20.

A validation of the transition 2017 makes the method go to a step 2018 which consists in erasing the new digital content of the update, henceforth inactive at this step of the method, so as to only therefore keep the re-activated past content, and once this erase operation is complete, in notifying the client computer 10 of the "ready for a next campaign" status of the target computer 20.

Starting from the step 1037 executed in the client computer 10, a transition 1038 is validated when the client computer 10 receives the notification of a "ready for a next campaign" status sent by the target computer 20 at the step 2018.

A validation of the transition 1038 makes the method go to a step 1039 which consists in generating a global report of campaign failure and, once complete, this report then being transmitted to the remote server 101 or 102 (not shown in FIG. 6). The global report of campaign failure generated at the step 1039 is updated by successive aggregations of the notifications received from each computer defined at the step 1035. Once all the notifications from each computer 20, 21 (for the gateway 21, several notifications are possible since the update could comprise contents destined for the gateway as such (for itself as gateway) and contents having a target 30 or 23), 23 defined at the step 1035 have been sent, the global report generated at this step 1039 will then be complete.

After this activation phase, successful or otherwise, for a first type of computer, the client computer 10 returns to the standby step of the method, as does the target computer 20, then they will switch off.

Figure 7:
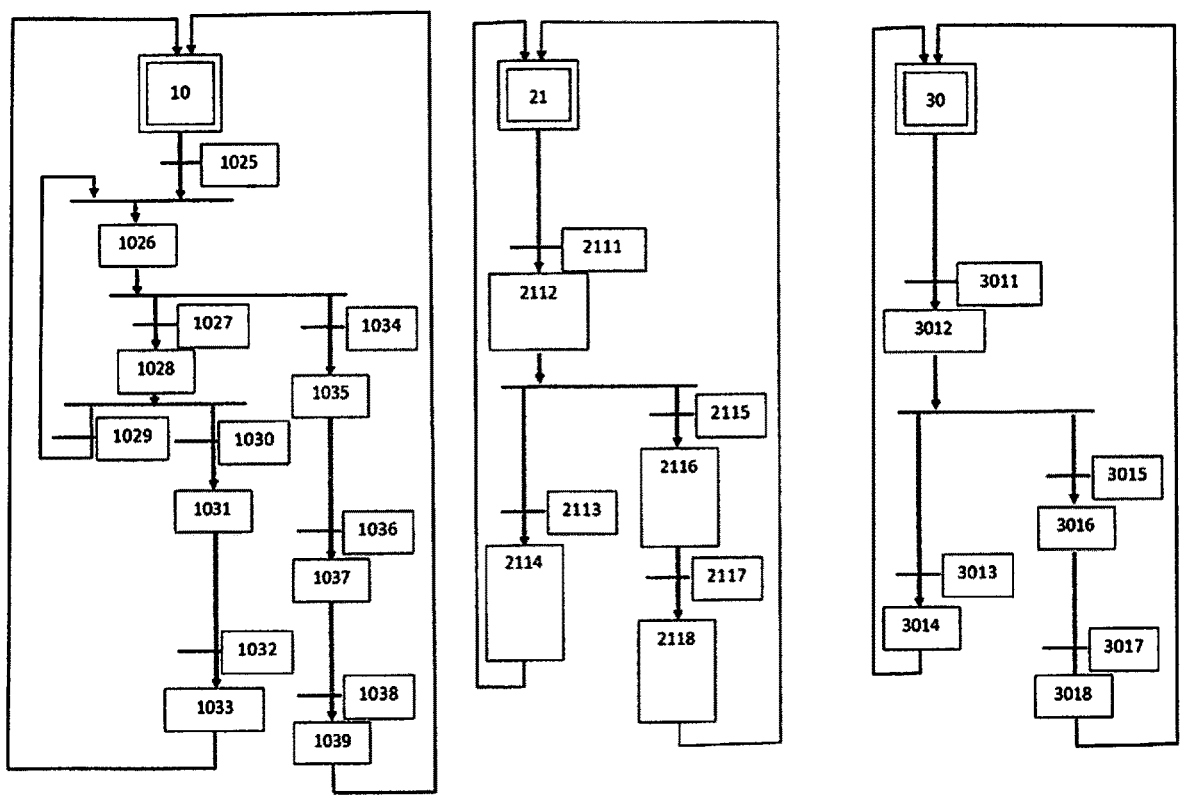
FIG. 7 shows activation steps for a second type of onboard computer updated.

FIG. 7 shows steps of the method according to the invention for carrying out the activation of an onboard target computer of the second type after installation. The steps now described are also executed disconnected from the outside world (off board). More precisely, the activation phase illustrated in FIG. 7 is carried out with a view to updating a second type of onboard computer 30 corresponding to one of the onboard computers 31, 32, 33 connected to the onboard gateway computer 21, in this case via the bus 6, and each equipped with data processing resources sufficient for processing the downloaded content intended for it.

Consecutively at the step 1024 for sending a notification of end of installation of the digital contents for the update campaign of the method by the onboard computer 10 to the module for managing dynamic configurations, also referred to as HMI proxy, located in the human-machine interface 12, which may itself be a part of the client computer 10, a transition 1025 is validated when the vehicle 4 is in the activation conditions required by the update campaign such as defined for this digital content in the management module. These conditions come from the pre-downloaded descriptive data characterizing each digital content, such as previously described. For example, a satisfactory condition for effecting the activation of the update of the computer of the second type 30 may, as previously described in FIG. 6, be generated by the fact, for the vehicle 4, of it being at the end of mission and, once at the end of mission, of having requested then obtained the authorization of the user by means of a virtual button displayed on the HMI 12. Indeed, this user request is preferred for this second type of computer 30 because their update is less instantaneous and requires the restarting of the engine to be blocked, which needs the user to be alerted. Thus, once the user authorization has been obtained, the restarting of the engine is prohibited.

A validation of the transition 1025 makes the method go to a step 1026 which consists in triggering the activation of the onboard computer addressee of the content, namely the gateway computer 21 since the target here is a computer of the second type 30, in other words situated in a secure area behind the gateway. At the step 1026, the onboard client computer 10 begins by defining the onboard addressee computer 21 by reading the downloaded digital content characterized by its descriptive data which contain this indication, then in raising an activation request to the onboard addressee computer, here gateway 21. Indeed, here the target computer having to be updated by this digital content is of the second type 30, situated behind the gateway, the addressee of the digital content identified is therefore the gateway, the client computer 10 being unaware that the target is a computer of the second type, namely one of the computers 31, 32, 33, and de facto the addressee computer to which the activation request is to be sent is identified as being the gateway computer 21.

In parallel, in the addressee gateway computer 21, after the step 2108 for sending the report, a transition 2111 is validated when the gateway computer 21 receives the activation request raised by the onboard client computer 10 at the activation triggering step 1026. By way of illustration, the onboard client computer 10 may use the CAN, FTP or Ethernet protocols for sending this request to the addressee computer 21 via the onboard bus 5, independently of the level of connectivity to a telecommunications network since these steps are executed disconnected from the outside world.

A validation of the transition 2111 makes the method go to a step 2112 which essentially consists in triggering the activation of the onboard target computer 30. At the step 2112, the onboard gateway computer 21 begins by defining the onboard target computer 30, in this case by reading the download list which, for example, takes the form of a table with, for each computer row, the status of the update, then in sending an activation request to the onboard target computer 30. Indeed, here the target computer needing to be updated, in other words whose digital content must be activated, is of the second type 30, namely one of the computers 31, 32, 33 connected indirectly to the client computer 10 via the gateway computer 21.

In parallel, starting from a standby step of the method executed in the onboard target computer 30 after the installation step 3004, a transition 3011 is validated when the gateway computer 30 receives the activation request sent out by the gateway computer 21 at the step 2112.

A validation of the transition 3011 makes the method go to a step 3012 which consists in activating the digital content installed at the step 3004 in the target computer 30, then notably in notifying the completion of the activation to the gateway computer 21, with the understanding that this notification may be a notification of success or a notification of failure of the activation. In the case of a dual-bank internal memory, the activation consists in switching from the active bank (current bank) to the other bank (containing the new digital content) and, in the case of an external memory, in transferring the new digital content from the external memory to the internal memory. It should be recalled that, if it is an external memory that the computer 30 is using, at this step of the method, the past digital content is still present in the external memory (whether the activation of the new replacement content has succeeded or otherwise), the latter not having been erased, and if the activation has succeeded, this new digital content is also in the internal active memory. If the target computer 30 disposes of a dual-bank internal memory, for example a re-writable EEPROM, this memory contains, in the active part, the new content together with everything that has been added at the step 3004 and, in the inactive part, the past content. In this case, this notification is routed by means of the bus 6, for example using FTP, CAN or Ethernet protocol. The receipt of this notification by the gateway computer 21 finalizes the step 2112 with the sending by the gateway computer 21 to the client computer 10 of the notification of success or a notification of failure of the activation, the gateway computer here playing a role of letter box.

Starting from the activation triggering step 1026 executed by the client computer 10, a transition 1027 is validated when a notification of success of the activation, notified by the gateway computer 21 at the step 2112, is received by the client computer 10.

A validation of the transition 1027 makes the method go to a step 1028 which consists in generating an internal report of activation, which will be completed at each receipt of a notification relating to a new activated digital content, and in verifying if there exists or not another digital content to be installed in the digital system.

Starting from the step 1028 executed in the client computer 10, a transition 1029 is validated if there exists another digital content to be installed in the digital system, in other words on an onboard computer whichever it is. The transition 1029 is therefore validated when another digital content to be installed is detected in the list of the downloaded digital contents. The validation of the transition 1029 makes the method loop back to the step 1026.

If there is no other digital content to be installed in the digital system, in other words the last digital content of the list of the downloaded digital contents has just been installed, the transition 1030 is validated and makes the method go to a step 1031 which consists, for the client computer 10, in sending a notification of end of campaign for the update in progress to the addressee gateway computer 21. It is accordingly after the successful activation of all the target computers 20, 30, 23 from the list that this notification of end of campaign is sent to each of the addressee computers 20, 21, 23. Each of the computers (in this case except for the last) has therefore waited in standby to receive this notification which confirms the success of all the activations of the update campaign. Indeed, this notification of end of campaign cannot be sent out beforehand in case one of the computers does not succeed in its activation, as will be explained in the following.

Starting from the activation triggering step 2112 executed by the gateway computer 21, a transition 2113 is validated when the notification of end of campaign, sent out by the onboard client computer 10 at the step 1031, is received by the gateway computer 21.

A validation of the transition 2113 makes the method go to a step 2114 which consists in sending a notification of end of campaign to the target computer 30.

In parallel, starting from the activation step 3012 executed with success by the target computer 30, a transition 3013 is validated when the target computer 30 receives the notification of end of campaign sent by the gateway computer 21 at the step 2114. A validation of the transition 3013 makes the method go to a step 3014 which consists in erasing (whether this be in the bank of the internal inactive memory or in the external memory) the past digital content, henceforth inactive at this step of the method, and, once this erase operation is complete, in notifying the gateway computer 21 of the "ready for a next campaign" status of the target computer 30. The receipt of this notification of the "ready for a next campaign" status by the gateway computer 21 finalizes the step 2114 with the sending by the gateway computer 21 to the client computer 10 of the "ready for a next campaign" status, the gateway computer here playing a role of letter box. It should be recalled that, in an internal EEPROM memory, a bank not emptied is not re-writable, and hence the importance of the erasing for a next update campaign.

Starting from the step 1031 for sending a notification of end of campaign executed in the client computer 10, a transition 1032 is validated when the client computer 10 receives the last notification of the "ready for a next campaign" status sent by the last computer from the list at the step 2114 or 2014.

A validation of the transition 1032 makes the method go to a step 1033 which consists in generating a global report of campaign success, the report generated being updated by successive aggregations at each "ready" status of target computer 20 or addressee computer 21. Once all the notifications of each computer 20, 30, 23 from the list has been sent, the global report generated at this step 2014 will be complete, this report being subsequently transmitted to the remote server 101 or 102 (not shown in FIG. 7).

On the other hand, as soon as an activation results in a failure at the step 3012 for a target computer 30, the step 2112 is finalized by sending a notification of failure of the activation by the gateway computer 21 to the client computer 10 and, starting from the activation triggering step 1026 executed by the client computer 10, a transition 1034 is validated as soon as the notification of failure of the activation is received by the client computer 10.

A validation of the transition 1034 makes the method go to a step 1035 which consists in triggering a general backtracking of all the computers of the digital system being subject to the update campaign. General backtracking is understood to mean a return to the initial state prior to the start of the campaign. At the step 1035, the onboard client computer 10 begins by defining all the onboard addressee computers being subject to the update campaign, then in sending out a backtracking request to each of these onboard addressee computers 20, 21, 23 defined. In this case, the target computer is of the second type 30 but the client computer 10 only knows that the addressee defined is the gateway computer 21, and the return request is therefore sent to the gateway computer 21.

Starting from the activation triggering step 2112 executed by the gateway computer 21, a transition 2115 is validated when the return request, raised by the onboard client computer 10 at the step 1035, is received by the gateway computer 21.

A validation of the transition 2115 makes the method go to a step 2116 which consists first of all in triggering the backtracking of the target computer 30 by sending a backtracking request to the target computer 30 (will therefore be sent out sequentially following the method to each target computer 30 defined at the step 1035). In parallel, in the target computer 30, the transition 3015 is validated when the target computer 30 receives the backtracking request raised by the gateway computer 21 at the step 2116. In this case, this request is routed by means of the bus 6. A validation of the transition 3015 makes the method go to a step 3016 which consists in carrying out the backtracking, therefore rendering the new digital content inactive if it wasn't already, and once this backtracking complete, in notifying it to the gateway computer 21 by sending a report of return to the initial state. This backtracking is achieved by switching, which switches back to the other bank in the case of a dual-bank internal memory, and by restoring the saved digital content in the case of an external memory. The receipt of this report of return to the initial state by the gateway computer 21 finalizes the step 2116 with the sending by the gateway computer 21 to the client computer 10 of the report of return to the initial state, the gateway computer 21 here playing a role of letter box.

Starting from the backtracking triggering step 1035 executed in the client computer 10, a transition 1036 is validated when the client computer 10 receives the report of return to the initial state sent by the gateway computer 21 at the step 2116.

A validation of the transition 1036 makes the method go to a step 1037 which consists in generating a report of campaign failure which will be completed by successive aggregations at each receipt of a report of return to the initial state (coming from each computer defined at the step 1035), then once all the notifications from all the target computers defined at the step 1035 have been received, the report of campaign failure generated at this step 1037 will be complete, and the notification of end of campaign sent to each of the addressee computers defined at the step 1035. In this case, for a computer of the second type, once this report is complete (in other words once all the computers defined at the step 1035 have returned to the initial state) the addressee gateway computer 21 is notified of the end of campaign.

In parallel, in the addressee computer 21, the transition 2117 is then validated when the onboard addressee gateway computer 21 receives the notification of end of campaign sent out by the onboard client computer 10 at the step 1037. In this case, this notification is routed by means of the bus 5.

A validation of the transition 2117 makes the method go to a step 2118 which consists first of all in sending a request for erasing of the new digital content of the update, henceforth inactive at this step of the method, so as to therefore only keep the re-activated past content (initial, prior to the update). In parallel, in the target computer 30, the transition 3017 is validated when the target computer 30 receives the backtracking request raised by the gateway computer 21 at the step 2118. In this case, this request is routed by means of the bus 6. A validation of the transition 3017 makes the method go to a step 3018 which consists in erasing the new digital content of the update if it wasn't already, and once this erase operation is complete, in notifying it to the gateway computer 21 by sending a "ready for a next campaign" status. The receipt of this "ready" status by the gateway computer 21 finalizes the step 2118 with the sending by the gateway computer 21 to the client computer 10 of the "ready for a next campaign" status from the target computer 30, the gateway computer 21 here playing a role of letter box.

Starting from the step 1037 executed in the client computer 10, a transition 1038 is validated when the client computer 10 receives the notification of "ready for a next campaign" status sent by the gateway computer 21 at the step 2118.

A validation of the transition 1038 makes the method go to a step 1039 which consists in generating a global report of campaign failure, this report once complete then being transmitted to the remote server 101 or 102 (not shown in FIG. 7) and in releasing the restarting prohibition. The global report of campaign failure generated at the step 1039 is updated by successive aggregations of the notifications received from each computer defined at the step 1035. Once all the notifications from each computer 20, 21 (for the gateway 21, several notifications are possible since the update could comprise contents destined for the gateway as such (for itself as gateway) and contents having a target 30 or 23), 23 defined at the step 1035 have been sent, the global report generated at this step 1039 will then be complete.

After this activation phase, successful or otherwise, for a second type of computer, the client computer 10 returns to the standby step of the method, as do the gateway computer 21 and target computer 30, then they will switch off. In the case of the activation phase of a computer of the third, in other words hybrid, type, the logic such as shown in FIG. 5 is applicable.

Irrespective of the type of computer, at the end of a successful activation phase, the past digital content has been erased in such a manner as to be ready for a next campaign and to prevent, for safety reasons, any return to the preceding version.

Generally speaking, when a step of the method does not end as expected, the method remains blocked in this step and a timer may be provided, for example in the client computer 10 or gateway computer 21, at the end of which a failure is detected so as to then initiate a reset to the initial state of the whole digital system, such as previously defined, with notification of the failure to the server.

The invention claimed is:

1. A method for updating a digital system in a vehicle having an onboard client computer configured to communicate with a remote server, an onboard monitor-control unit operatively connected to the onboard client computer via an onboard communications network, and an electrical energy accumulator device for powering the onboard client computer and the onboard monitor-control unit, the method comprising:
   - downloading a file from the remote server using the onboard client computer as long as the electrical energy accumulator device is capable of being recharged, the client computer constantly storing a progression point of the download in such a manner as to stop the download when a risk of degradation of communication with the remote server is detected, and resuming the download starting from the progression point that was stored upon detecting a disappearance of the risk of degradation in communication with the remote server;
   - distributing at least part of the file that was downloaded to the onboard monitor-control unit using the onboard client computer;
   - installing in the onboard monitor-control unit all or a portion of the at least part of the file that was distributed;
   - activating the at least part of the file that was installed after stopping the vehicle using the onboard monitor-control unit,
   - the electrical energy accumulator device not being capable of being recharged constituting a condition for detection of the risk of degradation in communication with the remote server.

2. The method as claimed in claim 1, wherein
   the electrical energy accumulator device is considered as being able to be recharged if a thermal engine of the vehicle is running.

3. The method as claimed in claim 1, wherein
   when the vehicle comprises an electric drive battery, the electrical energy accumulator device is considered as being able to be recharged if an electric drive battery of the vehicle is connected to an external electrical recharging system.

4. The method as claimed in claim 1, wherein
   the installing in the onboard monitor-control unit of all or a portion of the at least part of the file is executed by a gateway computer of the onboard communications network.

5. The method as claimed in claim 1, wherein
   the onboard monitor-control unit operates on a first bank of re-writable memory while performing the installing all or a portion of the at least part of the file in the onboard monitor-control unit to a second bank of re-writable memory.

6. The method as claimed in claim 1, further comprising descriptive data.

7. The method as claimed in claim 6, wherein
   at least a part of the descriptive data comprises configuration metadata.

8. The method as claimed in claim 7, further comprising
   verifying at least one activation condition, which is a function of at least a part of the configuration metadata.

9. The method as claimed in claim 1, wherein
   the activating of the at least part of the file requires authorization of a user of the vehicle in order to be executed.

* * * * *